United States Patent Office 3,030,433
Patented Apr. 17, 1962

3,030,433
POLYMERIZATION OF OLEFINS WITH METAL SALT HYDRATE-BF$_3$ COMPLEX
Harmon M. Knight, La Marque, and Joe T. Kelly, Dickinson, Tex., assignors, by mesne assignments, to Standard Oil Company of Indiana, Chicago, Ill., a corporation of Indiana
No Drawing. Filed Feb. 17, 1958, Ser. No. 715,502
8 Claims. (Cl. 260—680)

This invention relates to the polymerization of olefins to polymeric materials and particularly of tertiary olefins.

An object of the invention is a solid polymerization catalyst for certain olefins. Another object is a process of polymerizing tertiary olefins and particularly removing such olefins by polymerization from admixture with other olefins. A further object is a process for polymerizing conjugated diolefins. A particular object is a process employing a solid catalyst for polymerizing isobutylene. Other objects will become apparent in the course of the detailed description of the process.

In the process tertiary olefins and/or conjugated diolefins are contacted with a catalyst consisting essentially of a solid complex of a metal salt of an inorganic acid containing water of hydration and boron trifluoride. The polymeric product is then separated from the solid catalyst.

The catalyst of the invention is a solid formed by the reaction of boron trifluoride with a metal salt of an inorganic acid containing water of hydration hereinafter spoken of as a salt hydrate. The presence of BF$_3$ in the form of a complex results in a tremendously active material with respect to polymerization of the defined olefins. When a salt hydrate and BF$_3$ are contacted for a prolonged period of time a solid material is produced which contains the salt hydrate and about 1 mol of BF$_3$ per mol of water of hydration present in the salt hydrate. Although the ultimate complex contains this amount of BF$_3$ different salt hydrates behave differently in their speed of up-take of BF$_3$ and some do not in a reasonable length of time reach this ultimate BF$_3$ content of 1 mol per mol of hydrate water present. All salt hydrate BF$_3$ complexes are not equally effective as catalysts, even with the same molar BF$_3$ content. Some salt hydrates are extremely effective polymerization catalysts when only tiny amounts of BF$_3$ are reacted with the hydrate water. Other salt hydrates become only moderately effective catalysts even with the maximum theoretical amount of BF$_3$ reacted with the hydrate water. In general effective polymerization ability is present when the particular salt hydrate contains from about 0.1 to about 1 mol of BF$_3$ for each mol of water of hydration present in the salt hydrate. It is to be understood that when the defined salt hydrate contains water in excess of the theoretical amount of hydrate water in the form of adsorbed water the adsorbed extraneous water will take up BF$_3$ and therefore it is apparently possible for a salt hydrate to react with more than 1 mol of BF$_3$ per mol of the true hydrate water. It is preferred to operate with salt hydrates which have been dried to remove extraneous water for example, by carefully heating the particular salt hydrate below its decomposition temperature until the adsorbed water has been evaporated.

The complex is very readily prepared by introducing BF$_3$ into a vessel containing the particular salt hydrate and permitting the two materials to remain in the vessel until a constant BF$_3$ pressure is reached. Faster reaction is obtained by using the salt hydrate in a finely powdered form.

It is to be understood that the solid complex may be used as a catalyst directly. Or the salt hydrate may be deposited on a carrier such as charcoal, Fuller's earth, silica gel, alumina, silica alumina, etc. the carrier and salt hydrate are then exposed to BF$_3$ until the desired amount of BF$_3$ has reacted with the salt hydrate or complete complex formation has been attained.

The amount of BF$_3$ which will be taken up by some salt hydrates is also determined by the temperature at which the BF$_3$-salt hydrate complex is produced or is maintained. At ordinary temperature of about 20° C. a particular salt hydrate may complex with 1 mol of BF$_3$ per mol of hydrate water. On the other hand at 50° C. the complex may contain only about 0.7 mol of BF$_3$ per mol of hydrate water. When the complex of the higher temperature is brought to the lower temperature again and exposed to BF$_3$ enough BF$_3$ is taken up to return to the 1:1 BF$_3$ hydrate water ratio. Even though the solid complex in some cases does lose some BF$_3$ as the complex is brought to higher temperatures, the complex is not completely dissociated until exposure to temperature and time conditions such that the salt hydrate component itself dissociates by release of the water of hydration.

Thus the process may be carried out at temperatures and pressures normally associated with polymerization of olefins such as, isobutylene and diolefins such as butadiene. The upper temperature of operation is naturally limited by the dissociation temperature of the particular salt hydrate present in the solid complex catalyst. Particularly suitable temperatures are between about 0° C. and 50° C.

The hydrates of the following metal salts of inorganic acids readily form solid complexes with boron trifluoride: aluminum arsenate, aluminum borate, aluminum orthophosphate, aluminum polyphosphate, aluminum pyrophosphate, aluminum sulfate, aluminum tungstate; barium stannate; beryllium pyrophosphate, beryllium silicate, beryllium stannate, beryllium sulfate; bismuth stannate, bismuth tungstate; boron orthophosphate; calcium stannate, calcium sulfate; cadmium pyroantimonate, cadmium pyroarsenate, cadmium borate, cadmium borotungstate, cadmium orthophosphate, cadmium polyphosphate, cadmium pyrophosphate, cadmium stannate, cadmium sulfate, cadmium tungstate; cerous sulfate, cerous tungstate; cobaltous arsenate, cobaltous pyroarsenate, cobaltous borate, cobaltous molybdate, cobaltous orthophosphate, cobaltous polyphosphate, cobaltous pyrophosphate, cobaltous silicate, cobaltous stannate, cobaltous sulfate, cobaltous tungstate; chromic pyrophosphate, chromic sulfate, chromic tungstate; cupric arsenate, cupric borate, cupric polyphosphate, cupric pyrophosphate, cupric silicate, cupric stannate, cupric sulfate; ferrous pyrophosphate, ferrous silicate, ferrous stannate, ferrous sulfate; ferric pyroantimonate, ferric pyroarsenate, ferric molybdate, ferric orthophosphate, ferric polyphosphate, ferric pyrophosphate, ferric silicate, ferric stannate, ferric sulfate; potassium dihydro-pyroantimonate; magnesium pyroantimonate, magnesium arsenate, magnesium pyroarsenate, magnesium orthophosphate, magnesium pyrophosphate, magnesium silicate, magnesium stannate, magnesium sulfate; manganous pyroantimonate, manganous pyroarsenate, manganous borate, manganous polyphosphate, manganous pyrophosphate, manganous stannate, manganous sulfate; sodium orthophosphate, sodium pyrophosphate; nickel pyroantimonate, nickel pyroarsenate, nickel borotungstate, nickel molybdate, nickel orthophosphate, nickel pyrophosphate, nickel silicate, nickel silicomolybdate, nickel stannate, nickel sulfate, nickel tungstate; lead borate, lead stannate; antimony arsenate, antimony sulfate; stannous pyrophosphate, stannous sulfate; stannic pyroarsenate, stannic pyrophosphate; thorium pyrophosphate; titanium pyrophosphate; vanadium silicate, vanadium sulfate; zinc molybdate; zinc pyrophosphate, zinc silicate, zinc sulfate; zirconium pyrophosphate, zirconium silicate, zirconium sulfate; mixture of rare earth sulfates; and ceric sulfate.

Particularly suitable are ferric stannate containing about 5 mols of hydrate water and 1 mol of $BF_3$ per mol of hydrate water; cobalt arsenate hydrate containing 3 mols of water of hydration and 0.5 mol of $BF_3$ per mol of hydrate water; and ferric pyrophosphate hydrate containing about 7 mols of water of hydration and about 0.3 mol of $BF_3$ per mol of hydrate water.

The mono-olefin feed to the process is a tertiary olefin. Olefins which do not have a tertiary carbon atom are not appreciably affected by the catalyst of the instant process for example, a mixture of isobutylene, butene-1 and butene-2 contacted with one of the defined complexes results in a polymeric isobutylene product and essentially all the butene-1 and butene-2 are recovered unpolymerized. The olefin feed may be either essentially pure material or mixtures of olefins, reactive or reactive and inert, or mixtures of reactive olefins with other inert material such as the corresponding saturated hydrocarbons. Examples of suitable olefins are isobutylene (2-methylpropene), 2-methylbutene-1, 2-methylbutene-2, 2-methylpentene-1, 3-methylpentene-2, 2,3-dimethylbutene-1, 2-ethylpentene-1, 3-ethylpentene-2, 2,3,4-trimethylpentene-2, 2,6-dimethyloctene-1, and 2,4-dimethyloctene-4.

Conjugated diolefins are readily polymerized by the solid complex catalyst of the instant process. A mixture of the defined tertiary olefins and conjugated diolefins may be charged to the process. Examples of conjugated diolefins suitable for use in the process are: butadiene-1,3, pentadiene-1,3, isoprene, hexadiene-1,3, 2-methylpentadiene-1,3, 2-ethylbutadine-1,3, octadiene-2,4, 2-methylheptadiene-1,3, decadiene-1,3, and 3,7-dimethyloctadiene-1,3.

The process may be carried out by adding solid complex to a batch reactor and introducing the olefinic or diolefinic feed therein and permitting the catalyst and the reactive material to sit for the desired time at the particular temperature until reaction has been completed. It is more effective to use a complex which has been put into a finely powdered form and introducing olefin under conditions of temperature and pressure such that a substantial amount of liquid phase is present at the start of the polymerization. Stirring is used to provide better contacting of the powdered catalyst and the reactant material. The process may be carried out in a continuous manner by any of the procedures commonly used for polymerization for example, the feed material may be passed through a bed of solid complex, or it may be passed through a fixed-fluid bed of solid complex particles, or it may be passed through a fluid bed provided with continuous draw-off of catalyst and continuous introduction of fresh catalyst.

The process is illustrated by a number of examples carried out in a batch reactor. It is to be understood that these examples are illustrative only and do not limit the scope of the process.

EXAMPLE NO. 1

The reactor was a 4 liter carbon steel vessel. The vessel was oven dried before each test. Seventy-five grams of ferric pyrophosphate hydrate containing 6.5 mols of water of hydration was added to the dried vessel which was closed and the air removed therefrom by a vacuum pump. Technical grade isobutane in an amount of 500 grams was introduced into the evacuated vessel. This isobutane had been treated with calcium hydride to remove water. The vessel was placed in an ice bath and anhydrous boron trifluoride gas was added to the vessel at a slow rate until the pressure inside the vessel was 300 p.s.i.g. The vessel was placed in a rocker and rocked, for about 8 hours; then the vessel was allowed to stand about 24 more hours; then the vessel was depressured and evacuated to remove excess $BF_3$ and also the isobutane. Then the vessel was heated to 80° C. and the vacuum maintained for about one-half hour. By weighing the vessel the amount of $BF_3$ complexed was determined.

The vessel containing the solid complex of ferric pyrophosphate hydrate and 0.3 mol of $BF_3$ per mol of hydrate water was placed in a shaker in an ice bath and cooled to about 20° C. Anhydrous n-hexane was added to the vessel in an amount of about 500 ml. to serve as a solvent and also to improve heat transfer within the vessel. Technical grade isobutylene was added intermittently to the vessel with shaking of the vessel; the additions were adjusted to keep the temperature of the contents of the vessel below 40° C. After all the isobutylene had been added the vessel was shaken for 15 more minutes. The vessel was opened and the liquid material filtered from the solid complex. The liquid product was distilled on an efficient column to obtain a fraction of material boiling from 170–400° F. (gasoline range product) and material boiling above 400° F.

The operating conditions and the yield of product are set out below:

| | |
|---|---|
| $Fe_4(P_2O_7)_3 \cdot 6\frac{1}{2}H_2O$ (gm.) | 75 |
| $BF_3$ absorbed (gm.) | 18 |
| $BF_3/H_2O$ (molar) | 0.3 |
| Initial temp., ° C. | 13 |
| Total reaction time (min.) | 25 |
| Reactive feed charged (gm.) | 411 |
| Product( recovered): | |
| 170–400° F. (gm.) | 266 |
| Br number | 160.0 |
| Sp. gr. at 60° F. | 0.7636 |
| Octane number (research) | 101.3 |
| 400° F.+ (gm.) | 45 |
| Br number | 62.0 |
| Sp. gr. at 60° F. | 0.8227 |
| Kinematic visc. at 130° F. (cs./sec.) | 11.1 |
| Total product recovered (gm.) | 311 |

EXAMPLE NO. 2

In this example the catalyst was a solid complex of ferric pyrophosphate hydrate and $BF_3$ prepared as set out in Example No. 1. The reactor was charged with n-hexane diluent under conditions as in Example No. 1. The reactive material in this run was pure grade butadiene-1,3; this material contained 0.2 weight percent of t-butyl catechol stabilizer. All of the butadiene was charged without temperature rise in the reactor; when the material was completely charged the temperature in the reactor abruptly ran away and reached a maximum of about 175° C. and the initial pressure rose to about 550 p.s.i.g. After about 60 minutes the temperature started to drop in the reactor indicating completion of the reaction. The liquid product was separated from the complex catalyst by filtration and the hexane removed from the polymer product. The material boiling above 170° F. weighted 888 grams for conversion of 83 weight percent. This material was an extremely viscous liquid. The conditions and results of this example are set out hereinafter.

| | |
|---|---|
| $Fe_4(P_2O_7)_3 \cdot 6\frac{1}{2}H_2O$ (gm.) | 75 |
| $BF_3$ absorbed (gm.) | 18 |
| $BF_3/H_2O$ (molar) | 0.3 |
| Initial temp., ° C. ca | 175 |
| Total reaction time (min.) ca | 60 |
| Reactive feed charged (gm.) | 1067 |
| Product (recovered): | |
| Br number | 49.5 |
| Sp. gr. at 60° F. | 0.9226 |
| Maleic anhydride value | 2.5 |

EXAMPLES NOS. 3–9

Seven salts of differing composition were used as the salt hydrate portion of the complex in separate examples using isobutylene as the olefin feed. All of these examples were carried out following the procedure of Example No. 1. The results of these examples are set out in Table I.

It can be seen that solid complex contained $BF_3$ in a $BF_3$/water of hydration mol ratio ranging from 0.1 to 1. The initial temperatures ranged from 11° C. to 30° C.; in all cases the individual temperature surges increased to 40° C. The molar ratio of isobutylene charged to the 3. The process of claim 1 wherein said olefin is isobutylene.
4. The process of claim 1 wherein said diolefin is butadiene-1,3.
5. The process of claim 1 wherein said hydrate is ferric stannate hydrate.
6. The process of claim 1 wherein said hydrate is cobalt arsenate hydrate.

*Table I*
POLYMERIZATION OF ISOBUTYLENE

| Example Nos. | 3 | 4 | 5 |
|---|---|---|---|
| Salt (75 gm.) | $CdSO_4.H_2O$ | $Al_5(P_3O_{10})_3.6H_2O$ | $Fe_2(SnO_3)_3.4.7H_2O$ |
| $BF_3$ absorbed (gm.) | 16 | 66 | 35 |
| $BF_3/H_2O$ (molar) | 0.3 | 1 | 1 |
| Temp., ° C. | 20–30 | 11 | 25–35 |
| Reaction time, min | 60 | 45 | 70 |
| Isobutylene charged (gm.) | 290 | 387 | 402 |
| Isobutylene/salt hydrate (molar ratio) | 16 | 95 | 70 |
| Product (recovered): | | | |
| 170–400° F. (gm.) | 53 | 228 | 288 |
| Br number | 128 | 65 | 110 |
| Sp. gr. at 60° F | 0.7374 | 0.7612 | 0.7636 |
| Octane number (research) | 103.0 | 102.9 | 101.8 |
| 400° F.+ (gm.) | None | 85 | 84 |
| Br number | | 58 | 75 |
| Sp. gr. | | 0.8049 | 0.8160 |
| Viscosity (kinematic at 130° F., cs./sec.) | | 3.4 | |
| Viscosity index | | | |
| Product—Total recovered (gm.) | 53 | 313 | 372 |

| Example Nos. | 6 | 7 | 8 | 9 |
|---|---|---|---|---|
| Salt (75 gm.) | $FeSnO_x.3H_2O$ | $CoSiO_3.H_2O$ | $2CoB_2O_4.CoO_2H_2O$ [1] | $CoAs_2O_7.3H_2O$ |
| $BF_3$ absorbed (gm.) | 5 | 28 | 60 | 17 |
| $BF_3/H_2O$ (molar) | 0.1 | 1 | | 0.5 |
| Temp., ° C. | 10–15 | 15–30 | 15–30 | 15–30 |
| Reaction time, min | 25 | 35 | 22 | 30 |
| Isobutylene charged (gm.) | 408 | 582 | 443 | 545 |
| Isobutylene/salt hydrate (molar ratio) | 28 | 22 | | 51 |
| Product (recovered): | | | | |
| 170–400° F. (gm.) | 212 | [2] 110 | 100 | 192 |
| Br number | 110 | 119 | 131 | 116 |
| Sp. gr. at 60° F | 0.7587 | 0.7669 | 0.7661 | 0.7686 |
| Octane number (research) | 101.6 | 100.8 | 100.3 | 101.3 |
| 400° F.+ (gm.) | 146 | 358 | 285 | 323 |
| Br number | 61 | 61 | 53 | 55 |
| Sp. gr. | 0.8227 | | 0.8403 | 0.8304 |
| Viscosity (kinematic at 130° F., cs./sec.) | | 25.1 | 29.4 | 10 |
| Viscosity index | | 119 | 118 | 132 |
| Product—Total recovered (gm.) | 358 | 468 | 385 | 515 |

[1] Variable composition—18% water content.
[2] Some product lost in distillation.

salt hydrate varied from 16 to 95. This ratio has been based on the salt hydrate charged in order to eliminate the variable of $BF_3$ amount complexed.

Examination of the recovered product shows a variation in polymerization effectiveness of the different solid complexes not only in the overall conversion but in the amount compared with gasoline range material produced.

Thus having described the invention, what is claimed is:

1. A polymerization process comprising contacting an olefin selected from the class consisting of tertiary olefins, conjugated diolefins and mixtures thereof, with a catalyst consisting of a solid complex consisting of boron trifluoride and a metal salt wherein said salt is selected from the class consisting of arsenate, borate, phosphate, silicate, stannate and sulfate, which salt contains water of hydration and wherein said contacting is carried out at a temperature between about 0° C. and 50° C.

2. The process of claim 1 wherein said complex contains between about 0.1 and 1 mol of $BF_3$ per mol of water of hydration.

7. The process of claim 1 wherein said hydrate is ferric pyrophosphate hydrate.

8. A process comprising contacting isobutylene, at a temperature between 0° C. and 50° C., with a catalytic amount of a solid complex consisting of a metal salt wherein said salt is selected from the class consisting of arsenate, borate, phosphate, silicate, stannate and sulfate, which salt contains water of hydration and between about 0.1 and 1 mol of boron trifluoride per mol of water of hydration and separating isobutylene polymer from said complex.

References Cited in the file of this patent
UNITED STATES PATENTS

| 2,390,100 | Hughes | Dec. 4, 1945 |
| 2,824,146 | Kelly et al. | Feb. 18, 1958 |
| 2,824,151 | Kelly et al. | Feb. 18, 1958 |
| 2,824,156 | Kelly et al. | Feb. 18, 1958 |

FOREIGN PATENTS

| 737,026 | Great Britain | Sept. 21, 1955 |